C. J. LAWSON.
MACHINE FOR APPLYING BOTTLE CLOSURES.
APPLICATION FILED MAY 6, 1911.

1,095,406.

Patented May 5, 1914.

5 SHEETS—SHEET 3.

Attest:

Inventor:
by Clarence J. Lawson,
Robt B Killgore Atty

C. J. LAWSON.
MACHINE FOR APPLYING BOTTLE CLOSURES.
APPLICATION FILED MAY 6, 1911.
1,095,406.
Patented May 5, 1914.
5 SHEETS—SHEET 4.
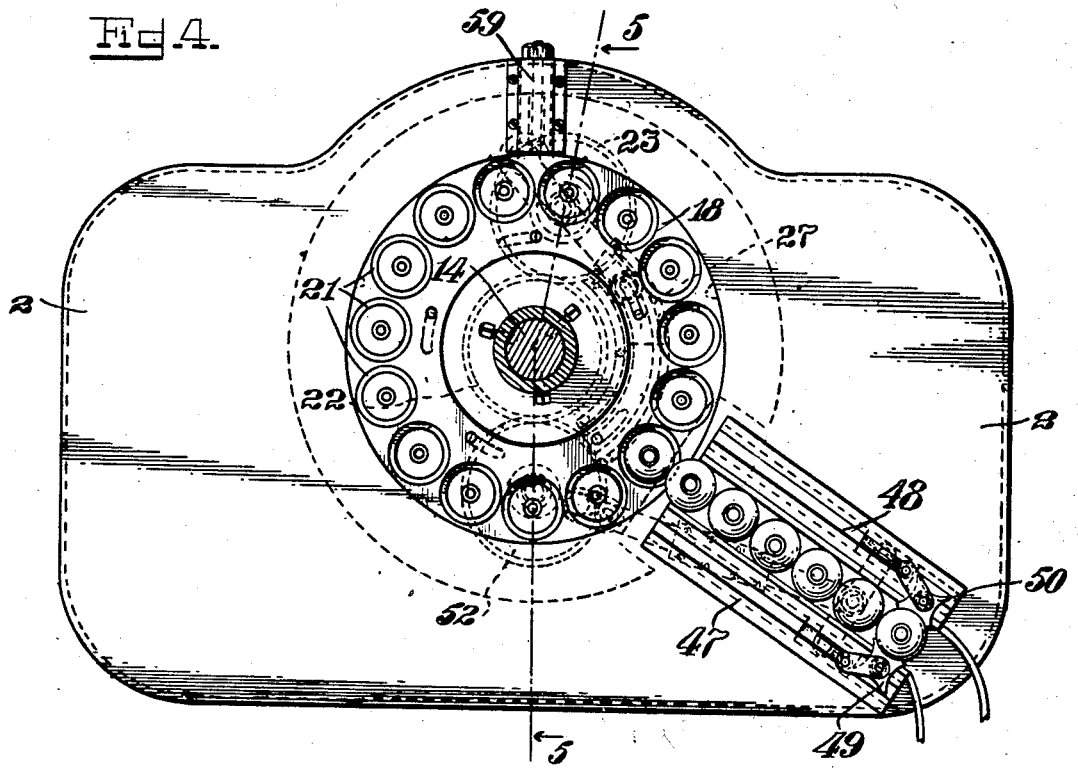
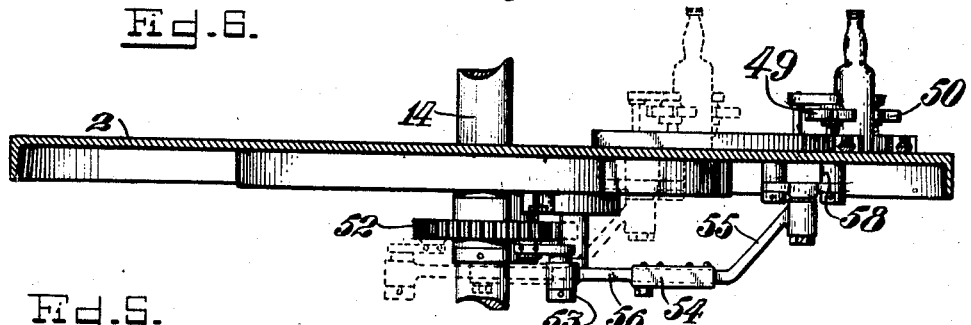
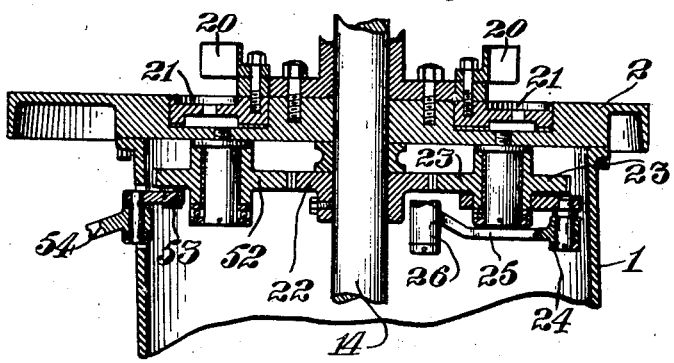

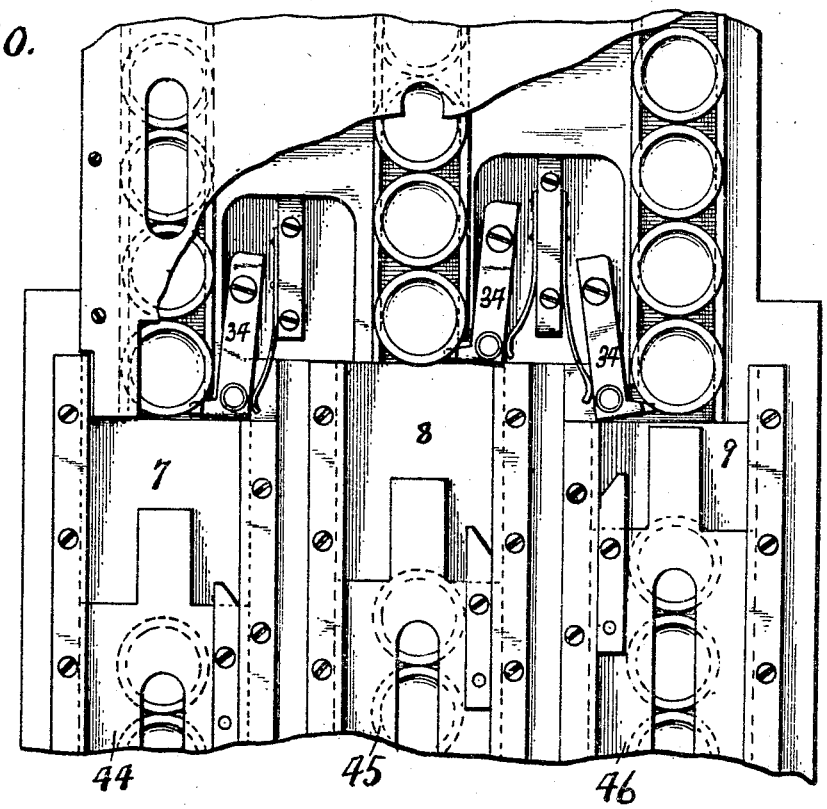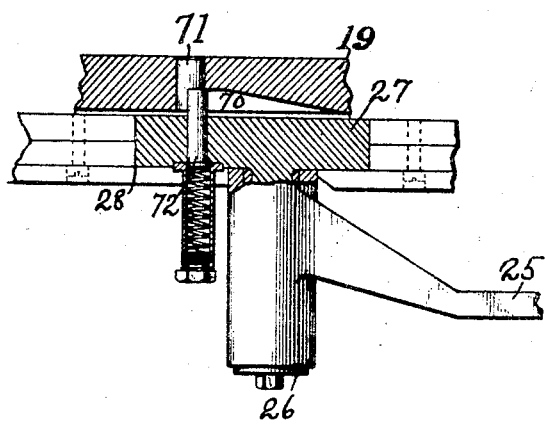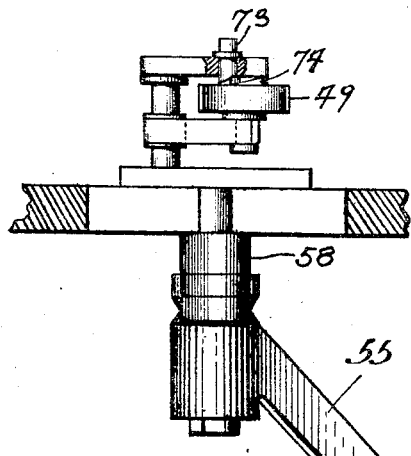

UNITED STATES PATENT OFFICE.

CLARENCE J. LAWSON, OF PLAINFIELD, NEW JERSEY, ASSIGNOR, BY DIRECT AND MESNE ASSIGNMENTS, TO COLUMBIA MACHINE & STOPPER CORPORATION, A CORPORATION OF NEW YORK.

MACHINE FOR APPLYING BOTTLE-CLOSURES.

1,095,406.   Specification of Letters Patent.   Patented May 5, 1914.

Application filed May 6, 1911. Serial No. 625,427.

*To all whom it may concern:*

Be it known that I, CLARENCE J. LAWSON, a citizen of the United States, residing at Plainfield, Union county, New Jersey, have invented a new and useful Machine for Applying Bottle-Closures, of which the following is a specification.

My invention relates to improvements in automatic machines for applying bottle closures to the necks of bottles in which a bottle capping head and a bottle support are reciprocated with respect to one another for the purpose of applying a bottle closure to the neck of an interposed bottle and my objects are the production of a mechanically simple and strong machine which will perform the operations reliably, successfully and quickly with a minimum of human attendance.

Figure 1:
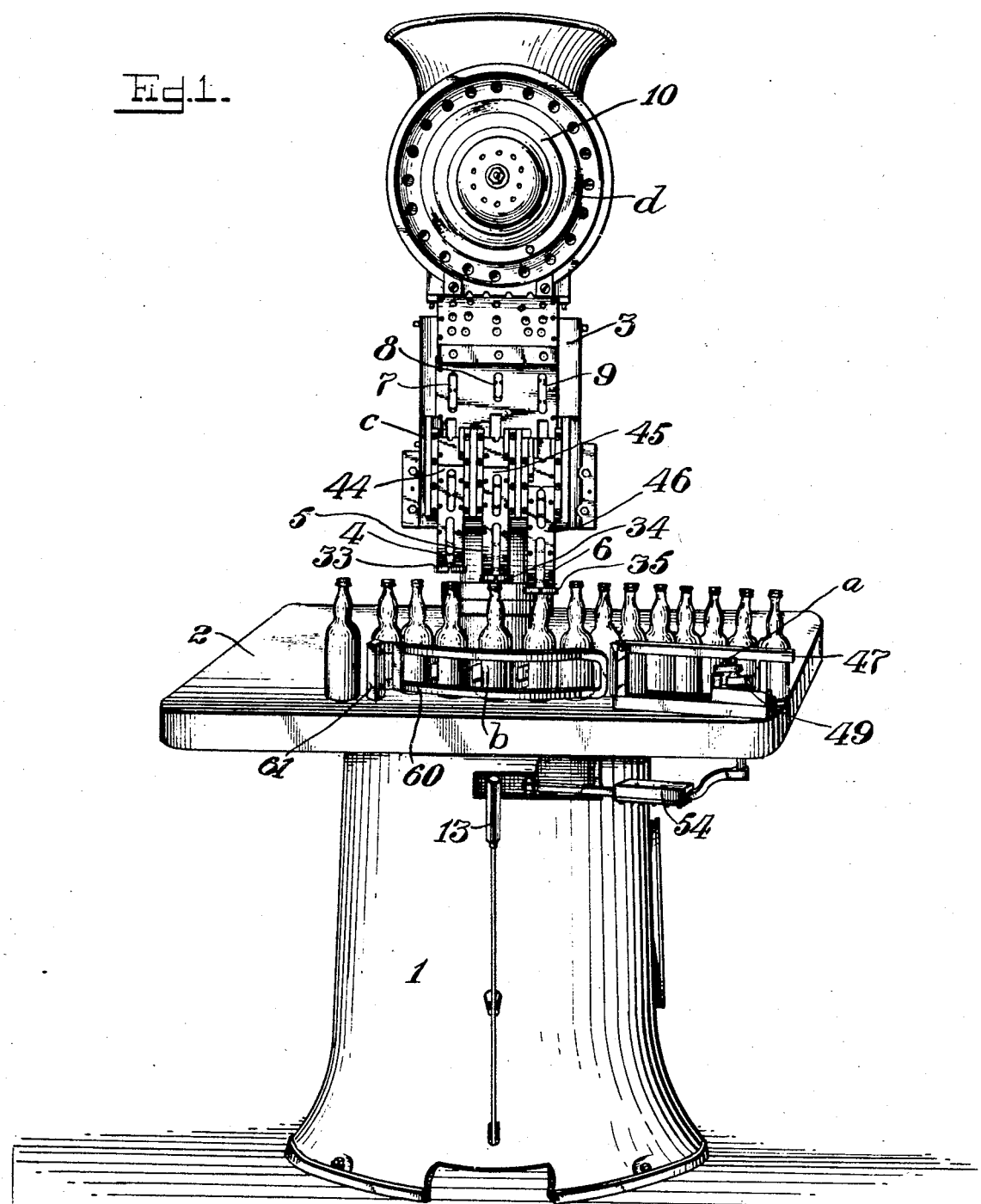
Figure 2:
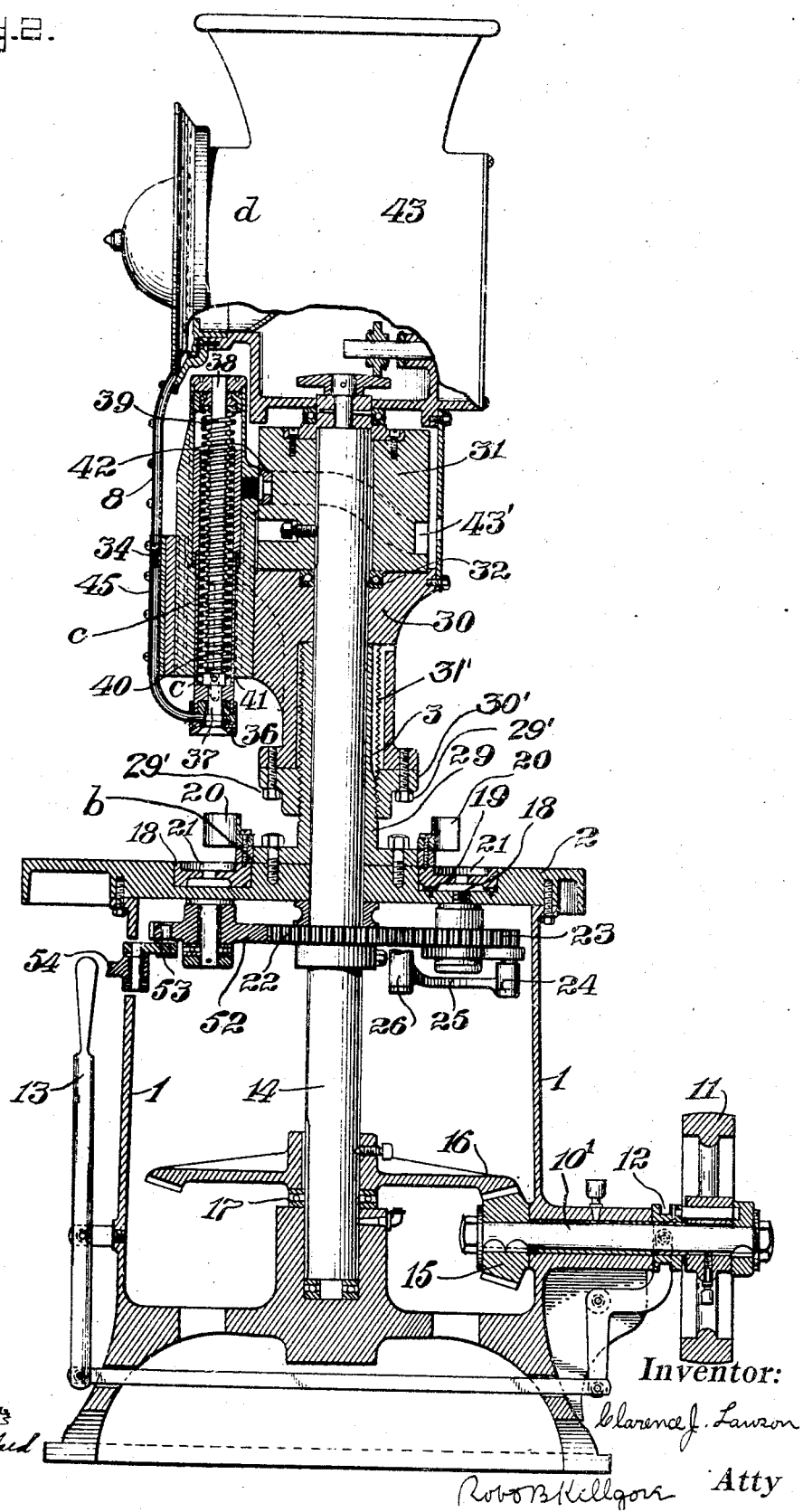
Figure 3:
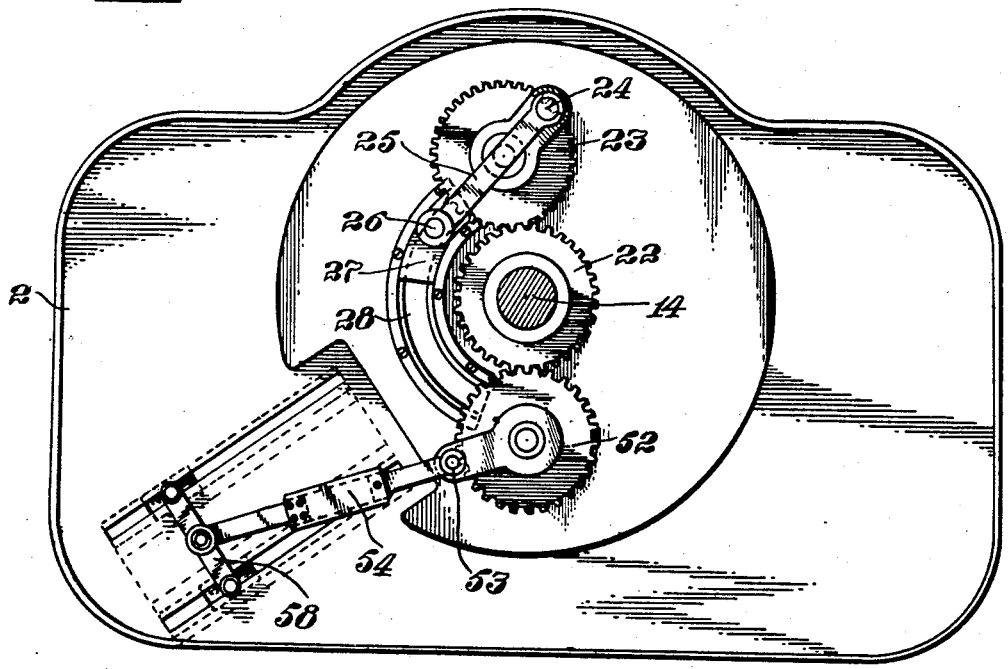
Figure 7:
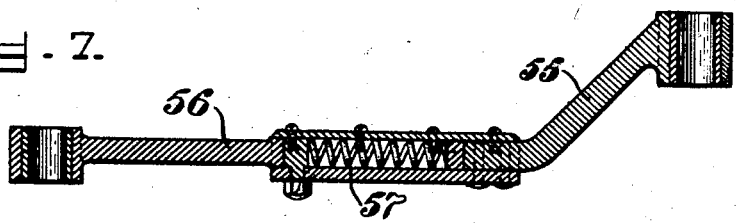
Figure 8:
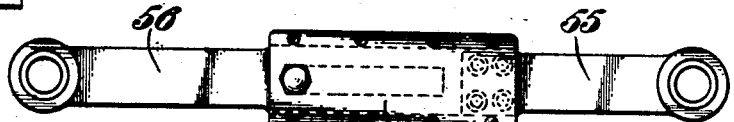
Figure 9:
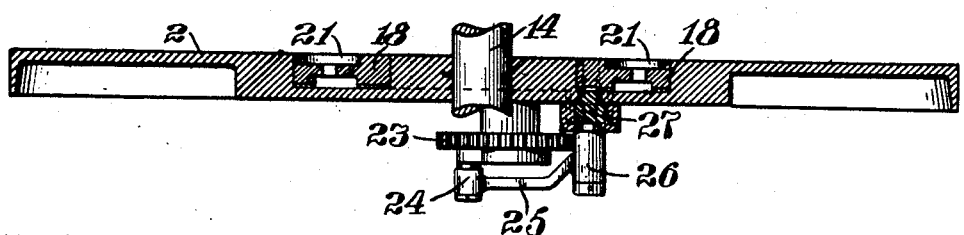

In the accompanying drawing Figure 1 is a perspective view of my machine; Fig. 2 a vertical view of the machine partly in section; Fig. 3 a view of the under side of the table; Fig. 4 a top view of the table; Fig. 5 a sectional view of the structure of Fig. 4 on the line 5—5; Fig. 6 a view partly in section of the bottle feed device; Fig. 7 a sectional, side view of the telescopic bottle feed link; Fig. 8 a top view of the bottle feed link; and Fig. 9 a detail view of the bottle support driving mechanism; Fig. 10 a detail view of the separable cap chutes; Fig. 11 a detail view of the bottle support actuating mechanism; and Fig. 12 a detail view of the bottle feed device.

The complete machine comprises four main groups of mechanism. First:—The bottle feeding device for delivering bottles to the rotating bottle support. Second:—The rotary bottle support and the mechanism for imparting a step by step or intermittent motion thereto. Third:—The sealing or capping heads located above the bottle support and the mechanism for applying and affixing closures or crowns to the necks of bottles. Fourth:—The hopper or means for supplying properly positioned closures or crowns to the sealing heads.

In order that the invention may be better understood the mode of operation of the machine shown in the accompanying drawings will be first described.

Bottles are received from the filling machine and enter the guideway of the bottle feeding device generally designated as $a$ in Fig. 1. This device is designed to deliver the filled, uncrowned bottles in groups of three to the bottle support generally designated as $b$ which is then rotated partially and stopped with three bottles under the three heads $c$. Each of these heads has previously been supplied with a closure or crown from the hopper $d$. The heads are successively reciprocated with respect to the bottles and the crowns applied to the necks thereof. The heads then rise, receive new crowns, the bottle support moves around and the capped bottles are ejected from the support. Meantime three uncapped bottles are moved by the bottle feed onto the bottle support as the support moves forward.

Having generally described the method of operation of my machine I will now proceed to the specific mechanism by which the operations are performed.

A base 1 forms a chamber within which the driving and operating gears are mounted and serves as a rest for the bottle table 2. A column 3 above the table carries the sealing heads 4, 5 and 6, closure chutes 7, 8 and 9 and hopper 10. The base 1 carries a drive shaft 10′ with a driving pulley 11 on the outer end which may be engaged and disengaged from the shaft by the intermediate clutch 12, which clutch is controlled by the lever 13 on the front of the machine within convenient reach of the operator. The shaft 10′ drives the main shaft 14 through the bevel gears 15 and 16. This main shaft rests on anti-friction bearings 17. This table 2 has a bottle support thereon and in the form shown in the drawing it comprises an annular ring 19 running in the groove 18 concentric with the shaft 14 and provided with the independent bottle pockets 20 and pads 21.

A gear 22 on the main shaft 14 meshes with a gear 23 on the under side of the table which gear 23 carries a stud or crank pin 24 engaging one end of a connecting rod 25. The other end of the connecting rod engages a stud 26 on a slide block 27 in a guide way 28 arranged on the arc of a circle whose center is the shaft 14. Clutch mechanism causes the block 27 to engage the bottle support 19 on the forward motion and the bottle support is idle on the return stroke of the slide block.

In Fig. 11 the bottle rest 19 is shown as provided with notches 70 in the under side, faced with the hardened wearing piece 71 which engages the spring pressed pin 72 on the block 27 on the forward movement but which pin slides under the bottle rest on the return stroke of the block to engage the next notch.

On the rotation of the main shaft 14 the block 27 will be reciprocated in the curved guideway and move the bottle rest 18 through a predetermined distance, being, in the machine illustrated, equal to three bottles on each reciprocation.

It is obvious that any suitable mechanism may be substituted for the above described means for rotating the bottle support without departing from the scope of my invention.

A sleeve 29 on the table forms a bearing for the upper part of the shaft 14 and is threaded to receive the cam ring support 30. A cam ring 31 rests on the anti-friction bearing 32 and rotates thereon with the shaft 14 to which it is secured.

The threaded connection between the sleeve 29 and the cam ring support 30 enables the heads to be raised or lowered for "nips," pints and quarts in bottle sizes.
This raising or lowering of the heads being effected by removing the bolts 29' and turning the nut 30' which raises or lowers the upper part 30 of the sleeve. A key (not shown for clearness of illustration) in the key way 31' preventing displacement of the upper part of the sleeve and keeping the sealing heads in proper vertical relation to the bottle supports. The bolts 29' are then replaced to lock the parts in proper adjustment.

The cam ring support carries on its front three sealing heads 4, 5 and 6 each head being provided with a throat 36, and a sealing plunger 37 on the end of the rod 38. These sealing heads are composed of tubular cases, and a helical spring 39 bearing on the plunger rod 38 gives sealing pressure to the crown while an outer, concentric spring 40 forms a cushion to prevent breakage when the head descends on a bottle, and operates the bending tool which affixes the cap to the bottle. The head reciprocates in a guideway 41 formed in the cam ring support, a roller 42 on the back of the head engaging the cam slot 43' in the cam ring 31. Upon rotation of the cam ring it is apparent that the sealing heads will rise and fall consecutively as the cam groove travels past the rollers on the heads. By reciprocating the heads instead of the bottles all agitation of the contents is prevented and I have found by experience that there is less liability of breakage of bottles.

The hopper 43 receives the crowns in a mass and passes them in proper position to the chutes 7, 8 and 9. The lower part of each chute, 44, 45 and 46 is attached to its head and the upper part is secured to the hopper. Latches 34 close the lower end of the upper part of each chute when the heads start on the downward stroke to prevent dropping of crowns. This is most clearly shown in Fig. 10 in which the lower chutes are shown separated from the upper chutes. The crowns then pass through the chutes to the sealing heads where they are retained in the throats until they have been affixed to the necks of the bottles.

The bottle feeding device for delivering the filled, uncrowned bottles to the bottle support comprises a pair of rails 47, 48, which extend from the bottle rest to the filler. A pair of star wheels 49, 50 are mounted on a sliding carriage 58. By a suitable connection the star wheels are locked against rotation on the inward, or delivery stroke of the feed device and are free to rotate on the outward stroke. This locking mechanism comprises the pawl 73 engaging the ratchets 74 on the star wheel as shown in Fig. 12. The reciprocation of the carriage and star wheels is effected by a gear 52 provided with a stud 53 which carries an extensible link 54 as shown in Figs. 7 and 8. This link is made of two parts 55 and 56, the part 56 being slidable in the part 55 against the compression of the spring 57. By this device bottles of overlarge diameters are not crushed when pushed up to the bottle support because the link will lengthen under a strain which would otherwise crush a bottle.

The other end of the link 54 engages the sliding carriage block 58 and on the rotation of the gear 52 the star wheels and carrier are reciprocated, moving the bottles in sets of three up to the bottle support.

The bottle ring is rotated a distance equal to three bottles in the machine shown so that as each bottle pocket passes the end of the guideway it will receive one of the three bottles being moved up by the star wheels. The star wheels rotating on the outward movement to pass the waiting bottles but locked on the inward movement to carry them to the bottle support.

The guard rail 60 in front of the capping heads holds the bottles firmly in their sockets while the crowns are being applied. This rail is fastened at one end to the post 61 by a spring hinge so that it may be swung out of the way to clear the machine of broken glass.

It is of course understood that these operations are performed in perfect time by reason of the various parts being geared together and positively driven.

While I have shown a machine containing three capping heads successively reciprocated I do not limit myself to any specific number of heads or to the successive reciprocation as it is apparent that all the heads may be mounted on one carrier and reciprocated as a unit.

I claim:—

1. A closure applying machine comprising a base; a main shaft extending vertically through the base; a bottle support movable about the shaft; means for imparting an intermittent rotary motion to the support; a plurality of non-rotary sealing heads above the bottle support and means for successively reciprocating said heads with respect to the bottle support.

2. A closure applying machine comprising a base; a main shaft extending vertically through the base; a bottle support movable about the shaft; means for imparting an intermittent rotary motion to the support; a plurality of non-rotary sealing heads above the support; means for successively reciprocating said heads with respect to the support and means for delivering properly positioned closures or crowns to each sealing head.

3. In a closure applying machine a base; a table on said base; a main shaft extending vertically through the base and table; a bottle support on the table movable about the shaft; a gear on said shaft; a second gear on the table; a crank pin on the second gear; a guideway on the table adjacent to the support; a slide block in the guideway; a link connecting the crank pin and slide block, means for engaging the slide block and bottle support during motion in one direction and disengaging the two on the reverse motion of the slide block whereby an intermittent rotary motion is imparted to the bottle support.

4. In a closure applying machine a base; a main shaft extending vertically therethrough; a bottle support movable about the shaft; means for imparting an intermittent rotary motion to the support; a sleeve around said shaft above the support; a second sleeve adjustably secured to the first sleeve; a plurality of non-rotary sealing heads slidably mounted on the second sleeve and means for reciprocating said sealing heads with respect to the support.

5. In a closure applying machine the combination of a bottle support, means for imparting an intermittent rotary motion thereto; a non-rotary sealing head above the support; means for reciprocating said head with respect to the support; a closure hopper; a divided chute from the hopper to the sealing head, the upper part of which is mounted on the hopper; a latch adapted to close the lower end of the chute when the parts are separated, the lower part of the chute being secured to the sealing head and reciprocating therewith.

6. A closure applying machine comprising a base; a main shaft extending vertically therethrough; a bottle support concentric with the shaft; means for imparting rotary motion to the shaft; a sleeve around said shaft above the table; a sealing head mounted on said sleeve; a cam ring on the shaft the groove of which engages the sealing head for imparting a reciprocating motion thereto upon the revolution of the shaft.

7. In a closure applying machine the combination with an intermittently rotating bottle rest of a feed device comprising a pair of star wheels; means for permitting free rotation of the wheels in one direction but locking them against rotation in the other; a pair of substantially parallel rails adjacent to the star wheels; and means for reciprocating said star wheels lengthwise of the rails.

8. In a closure applying machine the combination with an intermittently rotating bottle rest of a feed device comprising a pair of longitudinally movable carriers; means for reciprocating said carriers; and means for varying the length of the reciprocation upon undue pressure being applied to the carrier.

9. In a closure applying machine the combination with an intermittently rotating bottle support of a carrier adapted to reciprocate longitudinally; a link for imparting the reciprocation movement to the carrier; said link composed of two parts one of which telescopes within the other and a spring between the two parts whereby the link will vary its length under undue pressure.

10. A bottle sealing machine comprising a base, a main shaft extending vertically therethrough, a bottle support movable about the shaft, means for imparting an intermittent rotary motion to the bottle support, a series of sealing heads vertically movable above the bottle support, a cam ring on the shaft, means engaging the sealing heads and cam ring groove for reciprocating the heads upon the relative rotation of the cam ring and heads.

In testimony whereof I have hereunto subscribed my name in the presence of two witnesses.

CLARENCE J. LAWSON.

Witnesses:
 ROBT. B. KILLGORE,
 A. J. MANFRED.